Patented July 3, 1923.

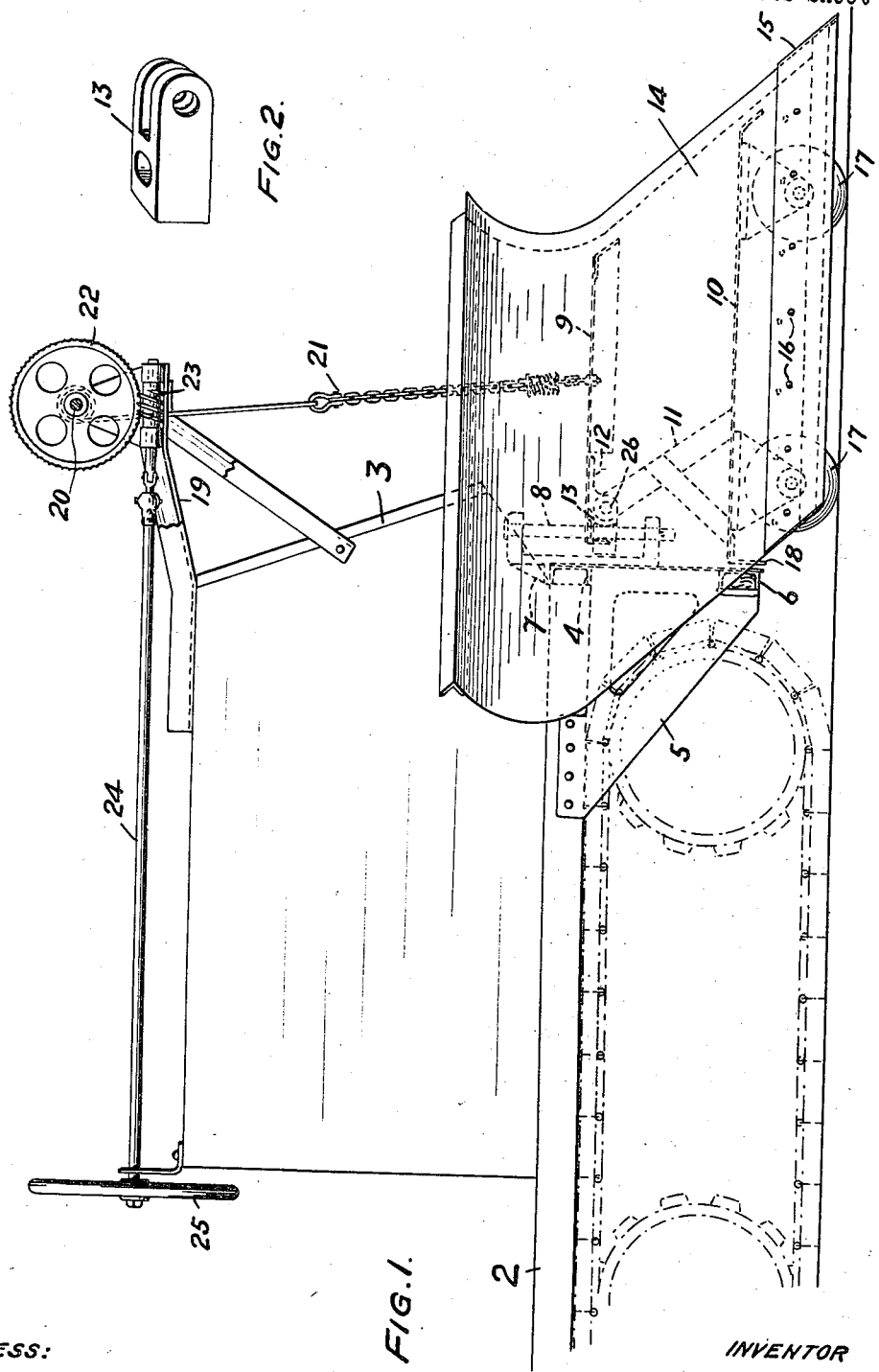

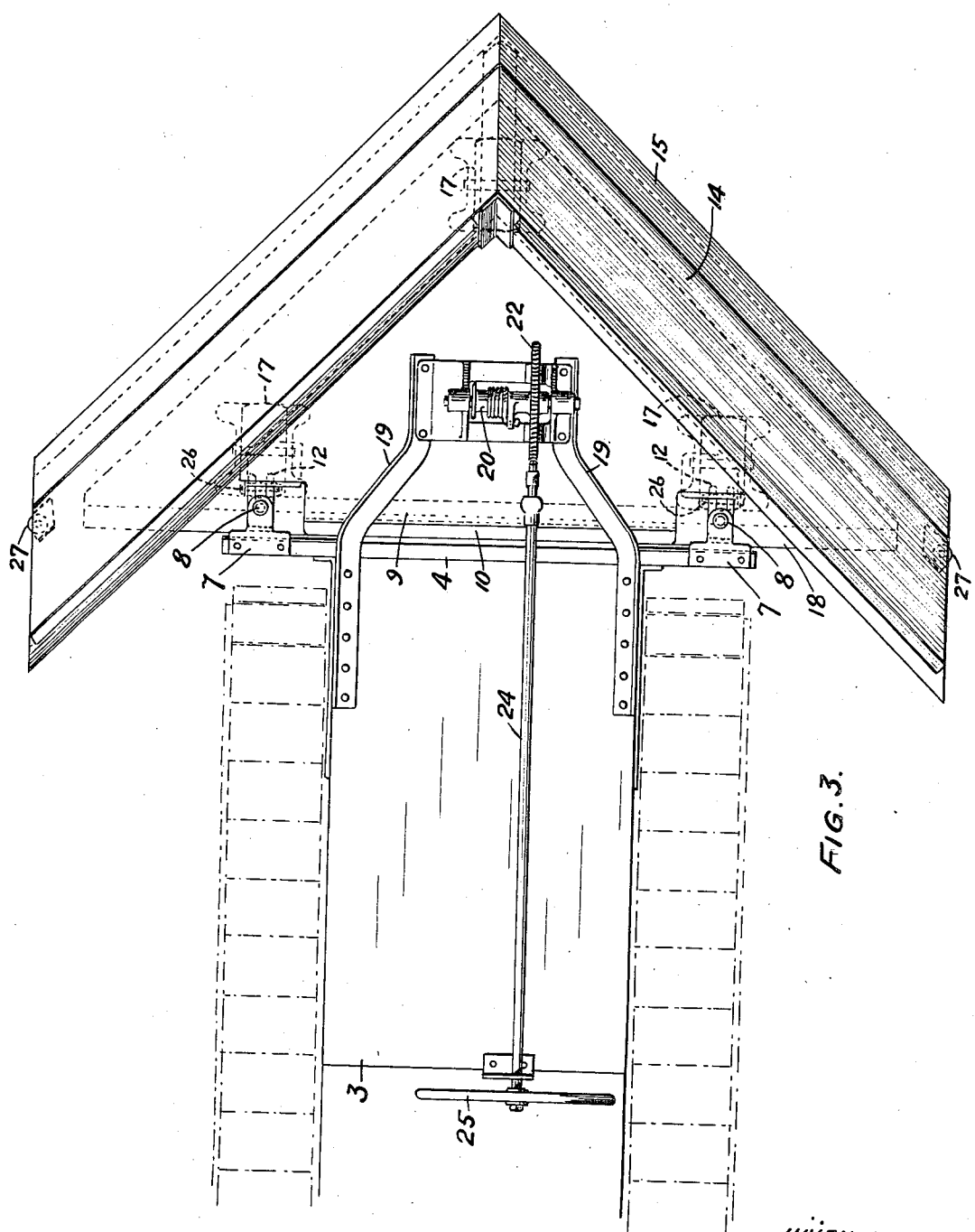

1,460,440

UNITED STATES PATENT OFFICE.

WILLIAM D. POLK, OF KENNETT SQUARE, PENNSYLVANIA, ASSIGNOR TO AMERICAN ROAD MACHINERY COMPANY, INC., OF KENNETT SQUARE, PENNSYLVANIA, A CORPORATION OF DELAWARE.

SNOWPLOW.

Application filed January 27, 1922. Serial No. 532,078.

*To all whom it may concern:*

Be it known that I, WILLIAM D. POLK, a citizen of the United States, residing at Kennett Square, county of Chester, and State of Pennsylvania, have invented a new and useful Improvement in Snowplows, of which the following is a full, clear, and exact description, reference being had to the accompanying drawings, which form a part of this specification.

This invention relates to an improvement in snow plows, and more particularly to plows to be used on roads, etc.

The object of my invention is to provide a plow of this character which is adapted to be attached to a truck, tractor, or road machine, in such a manner that when not in use it is carried solely by its supporting vehicle and when in use is pushed by the said vehicle; but is connected thereto in such a manner that the weight of the plow is carried by its own supporting wheels which roll on the ground, so that the pitching of the vehicle or plow caused by unevenness of the road will not be transmitted from one to the other.

The precise nature of my invention will be best understood by reference to the accompanying drawings, it being premised, however, that changes may be made in the details of construction without departing from the spirit and scope of my invention as defined in the appended claim.

Fig. 1 is a side elevation of one form of plow attached to a caterpillar tractor, a portion of which is shown in dotted lines.

Fig. 2 is a perspective view of one of the plow frame coupling blocks.

Fig. 3 is a plan view of the plow shown in Fig. 1.

In these drawings, the reference character 2 designates the longitudinal sills of the chassis of a caterpillar tractor and 3 a body and frame supported thereby. 4 is a bolster formed of channel iron connected to the ends of the longitudinal sills. 5 are brackets secured to the sills 2, there being one at each side of the chassis of the tractor. 6 is a second bolster or bumper connected to the lower ends of the brackets 5.

Connected to the bolster 4 are brackets 7, each of which is provided with a vertically disposed equalizing rod 8.

The plow comprises a triangular frame having an upper portion 9 and a lower portion 10, and 11 are struts connecting the rear ends of the frame portions to each other. 12 are brackets connected to the upper portion of the frame and pivotally connected to each bracket is a coupling block 13, each of which is slidably mounted on an equalizing bar 8.

14 are main plow shares which are connected to the frame portions 9 and 10, and connected to the main plow shares 14 are adjustable plow shares 15. These adjustable shares 15 are connected to the main shares by bolts 16, which pass through holes in both shares, the main shares being provided with a plurality of sets of holes to permit the shares to be adjusted relative to each other. 17 are plow supporting wheels which are rotatably mounted in brackets connected to the lower portion 10 of the plow frame.

The rear of the lower portion 10 of the frame is provided with a transverse angle iron brace or bolster 18, which is arranged to be engaged by bolster 6, when the plow is forced through a heavy drift of snow, or other material to be displaced.

Rotatably mounted in a bracket 19 on the frame of the body 3 is a shaft or winding drum 20 to which is connected one end of a plow lifting cable or chain 21, the other end thereof being connected to the frame of the snow plow. The winding drum is actuated by a worm wheel 22 connected thereto, which is in turn actuated by a worm 23 on a shaft 24. The shaft 24 is journaled in bearings on the frame of the body 3, and is provided with a hand wheel 25 whereby the operator can raise and lower the plow.

In Figs. 1 and 3 I have shown the plow in the position it occupies when in use and in which the entire weight of the plow is supported by the wheels 17.

The plow is normally pushed over the ground by means of the couplings with the equalizing bars 8, but if the plow is subjected to a shock or heavy resistance due to deep snow or material to remove, the bolster 18 will be moved into engagement with bolster 6 and thereby avoid any tendency of the plow to turn over. As the plow is connected to the tractor through the equalizing rods 8, the pitching of the plow or tractor will not be transmitted from the one to the other. Due to the fact that there are but two coupling blocks connected to the two equalizing rods at a single level and that the two bolsters are not confined from relative lateral movement, it is possible to provide for the lateral tilting movement of the plow relatively to the tractor that occurs in traveling over uneven ground. All that is necessary is to avoid a tight fit between the coupling blocks and their respective equalizing rods. In Fig. 2, the orifice in the coupling block is shown as being of somewhat greater diameter in a lateral direction than in a longitudinal direction, thereby making special provision for this relative transverse swinging action of plow and vehicle, although a mere looseness of fit, such as gives perfect freedom of the plow to rise and fall, will give this capacity to a substantial degree. It will, therefore, be understood that the tractor and plow are free to rise and fall independently and adapt themselves to inequalities in the surface over which they are moving without transmitting bending stresses from the one to the other.

When it is desired to move the device from place to place without using the plow, the operator turns the hand wheel 25 and through the various connections will lift the plow from the ground until the blocks 13 engage the upper ears of brackets 7, and any further lifting of the flexible member 21 will raise the front of the plow and swing the plow about the axes of the pins 26 connecting the blocks 13 to the brackets 12.

Side rollers 27 may be mounted on the ends of the shares as shown in Fig. 3 for protection against curb or side walls.

Having now fully described my invention, what I claim and desire to protect by Letters Patent is:

The combination of a push vehicle, vertical equalizing rods, one at each side of the vehicle frame, a transverse bolster on the vehicle below and independent of the equalizing rods, coupling blocks, one for each equalizing rod and freely slidable thereon, a plow frame in advance of the vehicle and pivotally connected with said coupling blocks, plow shares connected to the plow frame, and a bolster on the plow frame immediately in front of the vehicle bolster, said bolsters being arranged substantially below the center of gravity of the plow and having unconfined capacity for lateral movement relatively to each other, whereby the maximum pushing force may be applied to the plow against resistance to forward movement, the specified connections of the plow with the equalizing rods and the bolster construction specified not only allowing the bolsters to advance to and recede from each other but also allowing relatively lateral swinging movements as well as vertical movements of the plow and push vehicle in traveling over uneven ground.

In testimony of which invention, I have hereunto set my hand, at Kennett Square, Penna., on this 25th day of January, 1922.

WM. D. POLK.